US011535337B2

(12) United States Patent
Van Druten et al.

(10) Patent No.: US 11,535,337 B2
(45) Date of Patent: Dec. 27, 2022

(54) REAR WHEEL AXLE, AS WELL AS BICYCLE FRAME AND REAR WHEEL FOR A BICYCLE

(71) Applicant: ADVANCING TECHNOLOGIES B.V., Eindhoven (NL)

(72) Inventors: Roëll Marie Van Druten, Eindhoven (NL); Johannes Gijsbertus Antonius Van Den Brand, Eindhoven (NL)

(73) Assignee: ADVANCING TECHNOLOGIES B.V., Eindhoven (NL)

( * ) Notice: Subject to any disclaimer, the term of this patent is extended or adjusted under 35 U.S.C. 154(b) by 330 days.

(21) Appl. No.: 15/122,207

(22) PCT Filed: Mar. 2, 2015

(86) PCT No.: PCT/NL2015/050127
§ 371 (c)(1),
(2) Date: Aug. 29, 2016

(87) PCT Pub. No.: WO2015/130174
PCT Pub. Date: Sep. 3, 2015

(65) Prior Publication Data
US 2016/0362160 A1    Dec. 15, 2016

(30) Foreign Application Priority Data

Feb. 28, 2014   (NL) ...................................... 2012340
Apr. 12, 2014   (NL) ...................................... 2012611

(51) Int. Cl.
*B62M 9/122*      (2010.01)
*B62M 25/08*      (2006.01)
(Continued)

(52) U.S. Cl.
CPC ............. *B62M 9/122* (2013.01); *B60B 35/04* (2013.01); *B60B 35/08* (2013.01); *B62J 50/22* (2020.02);
(Continued)

(58) Field of Classification Search
CPC .......... B62M 9/22; B62M 9/10; B62M 11/16; B62M 25/08; B62M 9/122; B60B 35/04;
(Continued)

(56) References Cited

U.S. PATENT DOCUMENTS 4,400,999 A    8/1983   Steuer
5,480,356 A    1/1996   Campagnolo
(Continued)

FOREIGN PATENT DOCUMENTS

EP          1595784       11/2005
EP          1612130       1/2006
(Continued)

OTHER PUBLICATIONS

International Search Report and Written Opinion of the International Searching Authority PCT/NL2015/050127 dated Jul. 14, 2015.
(Continued)

*Primary Examiner* — Jacob B Meyer
*Assistant Examiner* — Maurice L Williams
(74) *Attorney, Agent, or Firm* — Nixon & Vanderhye

(57) ABSTRACT

A bicycle includes a transmission having two switchable drives between a driver body on which rear sprockets are positioned and a wheel hub of a rear wheel. The bicycle has actuation elements for switching between drives and operating elements for operating the actuation elements. The bicycle includes only a single front sprocket. The actuation elements are embodied in an electrical version and the operating elements are electrically coupled to the actuation
(Continued)

elements. By advantageously selecting the drives of the driver between the cassette housing and wheel hub, a front derailleur may be omitted. The driver allows operation with only little energy, since the chain need not be shifted. consequently, the actuation elements require little energy for changing the drive between the crank axle and the wheel hub of the bicycle, so that it is pre-eminently suitable for these actuation elements and their operation to be executed as an electrical version.

10 Claims, 4 Drawing Sheets

(51) Int. Cl.
    *B62M 11/16*    (2006.01)
    *B62M 9/10*    (2006.01)
    *B60B 35/04*    (2006.01)
    *B60B 35/08*    (2006.01)
    *B62M 1/36*    (2013.01)
    *B62J 50/22*    (2020.01)
    *B62K 3/02*    (2006.01)
    *B62J 45/00*    (2020.01)

(52) U.S. Cl.
    CPC ................. *B62K 3/02* (2013.01); *B62M 1/36* (2013.01); *B62M 9/10* (2013.01); *B62M 11/16* (2013.01); *B62M 25/08* (2013.01); *B62J 45/00* (2020.02)

(58) Field of Classification Search
    CPC ............... B60B 35/08; B62J 2099/0026; B62J 2099/004; B62J 45/00; B62K 25/02
    See application file for complete search history.

(56) References Cited

U.S. PATENT DOCUMENTS

| | | | |
|---|---|---|---|
| 6,354,980 B1 | 3/2002 | Grant | |
| 6,380,731 B1* | 4/2002 | Nishimoto | B62M 25/08 280/238 |
| 7,042,123 B2 | 5/2006 | Kitamura et al. | |
| 7,195,088 B2 | 3/2007 | Matsueda et al. | |
| 8,336,400 B2* | 12/2012 | Lassanske | B60B 27/0068 73/862.29 |
| 8,721,495 B2* | 5/2014 | Kitamura | B62J 6/06 474/80 |
| 8,882,122 B2* | 11/2014 | Emura | B62M 25/08 280/200 |
| 9,428,246 B2 | 8/2016 | Kitamura et al. | |
| 2003/0092519 A1* | 5/2003 | Fukuda | B62M 9/127 474/70 |
| 2005/0253356 A1* | 11/2005 | Matsueda | B62K 25/30 280/260 |
| 2005/0285461 A1* | 12/2005 | Kitamura | B62M 25/08 310/67 A |
| 2009/0008987 A1* | 1/2009 | Hoogendoorn | B60B 27/0052 301/110.5 |
| 2009/0305831 A1* | 12/2009 | Moeller | B62M 6/65 475/5 |
| 2010/0244401 A1* | 9/2010 | Hara | B62M 25/045 280/261 |
| 2011/0009231 A1* | 1/2011 | Shoge | B60B 27/0005 475/297 |
| 2012/0304783 A1* | 12/2012 | Kitamura | B60B 27/023 73/862.49 |
| 2012/0305325 A1* | 12/2012 | Ito | B62M 6/65 180/206.6 |
| 2013/0049445 A1* | 2/2013 | Kitamura | B60B 27/0068 301/110.5 |
| 2013/0145885 A1* | 6/2013 | Kitamura | B62M 25/08 74/473.12 |
| 2014/0074348 A1* | 3/2014 | Kitamura | G01L 25/006 701/33.1 |
| 2014/0300078 A1* | 10/2014 | Ruffieux | B62L 5/00 280/261 |

FOREIGN PATENT DOCUMENTS

| | | |
|---|---|---|
| EP | 1702837 | 9/2006 |
| EP | 2535254 | 12/2012 |
| EP | 2535257 | 12/2012 |
| GB | 2062139 | 5/1981 |
| JP | S56-60786 | 5/1981 |
| JP | 2005-324648 | 11/2005 |
| JP | 2006-008062 | 1/2006 |
| JP | 2013-121834 | 6/2013 |

OTHER PUBLICATIONS

Chinese Office Action for Application No. 201580023698.1, dated Sep. 25, 2018, with English translation provided.

* cited by examiner

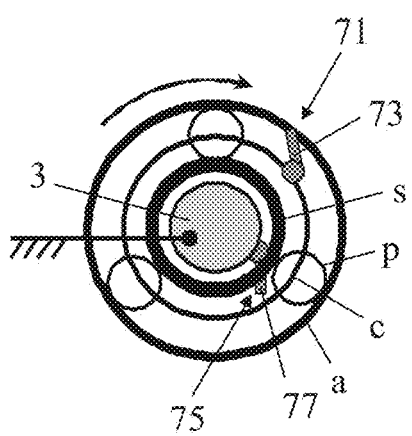
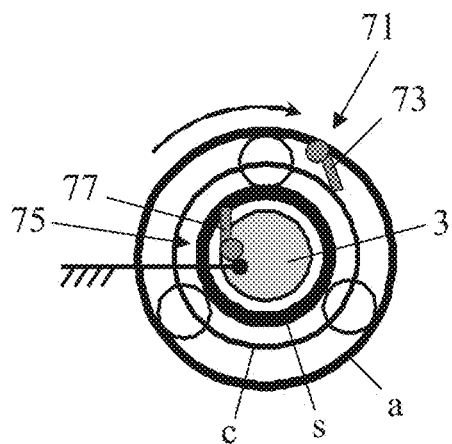
FIG. 3  FIG. 4
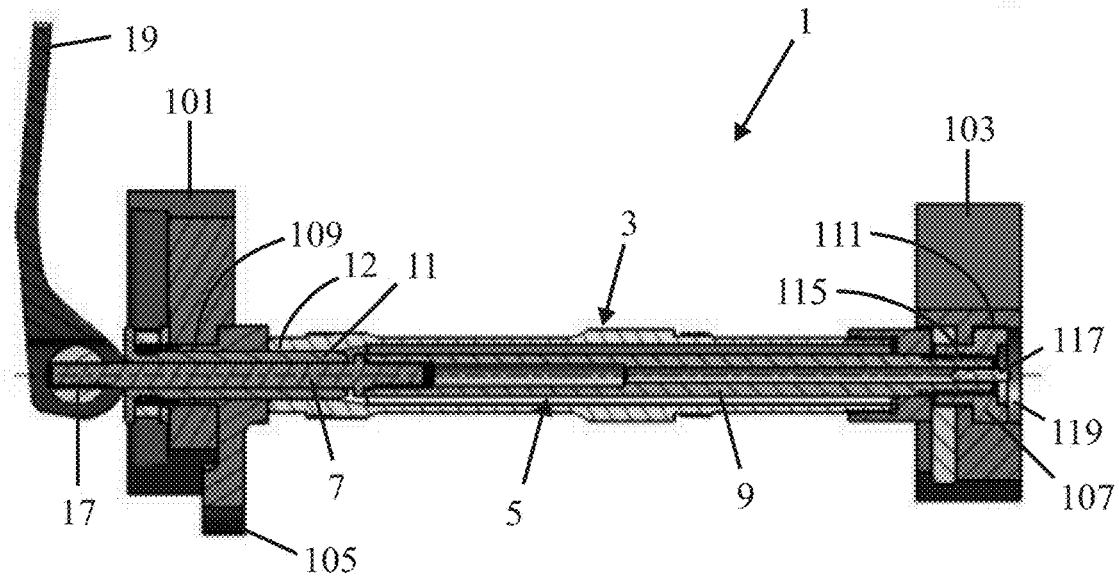
FIG. 5
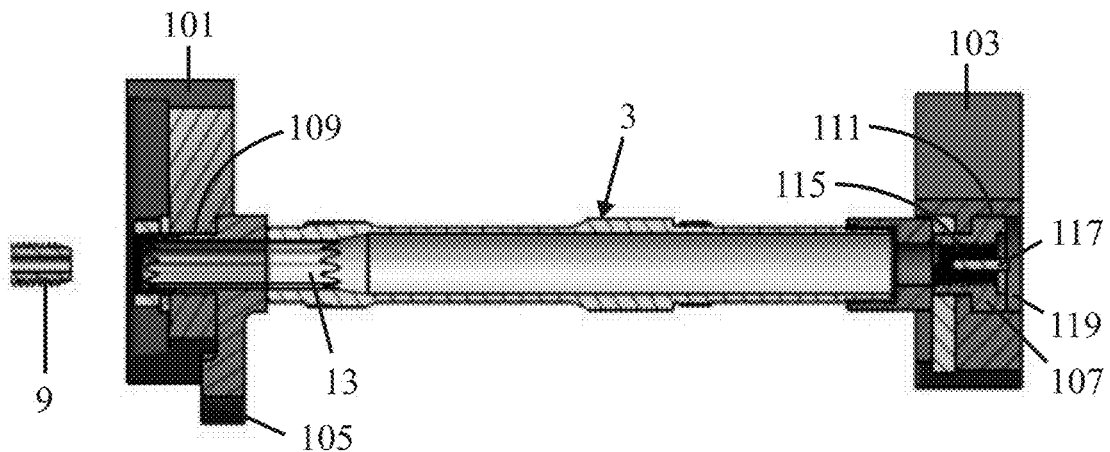
FIG. 6

REAR WHEEL AXLE, AS WELL AS BICYCLE FRAME AND REAR WHEEL FOR A BICYCLE

FIELD OF THE INVENTION

The invention relates to a bicycle comprising:
a frame comprising a front fork and a rear fork, as well as an axle housing,
a front wheel and a rear wheel fitted to the front and rear fork respectively,
a drive axle which is bearing-mounted in the axle housing,
at least a single front sprocket which is connected to the drive axle,
at least a single rear sprocket which is connected to a wheel hub of the rear wheel,
a chain threaded around the front and rear sprocket,
a transmission comprising at least two drives between the drive axle and the rear wheel hub and provided with actuation means for switching between the drives, and
operating means for operating the actuation means,
where the actuation means of the transmission are electrically actuated and the operating means are electrically coupled to the actuation means, and
where a storage element for storing electrical energy is coupled to the actuation means and/or operating means.

The electrical coupling of the operating means to the actuation means may in this case be arranged as a wired coupling or a wireless coupling.

When a drive axle is concerned there may be thought of a crank axle where the axle housing in that case is formed by a crank axle housing.

When an electrical energy storage element is concerned there may be thought of a battery or a capacitor.

It is advantageous to electrically actuate the switching mechanism for changing the drive between the crank axle and the wheel hub. As a consequence of this there is no need for a mechanical connection between the operating buttons/levers and the switching mechanism.

STATE OF THE ART

A bicycle of this type is known from U.S. Pat. No. 6,354,980 B1. A disadvantage of an electrically actuated and operated transmission is that the battery or batteries are to be replaced on a regular basis. Usually they are not replaced until it has been experienced that they do not supply a sufficient amount of current and at that moment no new batteries are available, so that temporarily no switching can be performed.

SUMMARY OF THE INVENTION

It is an object of the invention to provide a bicycle of the type defined in the opening paragraph where said disadvantage does not occur. For this purpose, the bicycle according to the invention is characterized in that the bicycle comprises a generator or current generating means which converts/convert motion energy to current, as well as a charger connected to this generator or current generating means and to the electrical energy storage element for charging the storage element. The generator is preferably arranged as a micro generator. The storage element is automatically recharged, so that always a sufficient amount of energy is available for switching. Application of such micro generators or energy generating means (kinetic energy harvesting system) is possible if the current consumption of the actuators is sufficiently low and switching does not take place on a continuous basis but in between switching operations some time is left for the battery to be recharged, such as for example, when switching the transmission.

Preferably, the generator or the current generating means which converts/convert motion energy to current is/are connected to the wheel hub and/or the wheel axle.

An advantageous embodiment of the bicycle according to the invention is characterized in that the storage element for storing electrical energy is connected to the wheel axle. Since the storage element need no longer be replaced on a regular basis, it may advantageously be fitted close to the actuation means, so that the chance of undesired interruption of the connection between the storage element and the actuation means is strongly reduced.

A further advantageous embodiment of the bicycle according to the invention is characterized in that:
the transmission is present between the rear sprocket and the wheel hub of the rear wheel,
the wheel hub and the transmission are positioned on a hollow wheel axle, and
an axle shaft is inserted through the hollow wheel axle via which axle shaft the wheel axle is connected to the rear fork.

An advantage of this construction is that the hollow wheel axle creates opportunities for accommodating or connecting component parts such as electrical conductors for coupling the actuation means to the operating means.

It should be observed that this embodiment also allows of being applied to a bicycle that is not equipped with a generator or current generating means, and can thus also be applied advantageously to a bicycle in which the storage element does have to be replaced on a regular basis.

A still further embodiment of the bicycle according to the invention is characterized in that:
seen in axial direction of the wheel axle, the transmission is chiefly positioned outside rear wheel spoke flanges,
the transmission actuation means are positioned inside a driver body of the transmission,
the hollow wheel axle comprises two separate axle parts, where the wheel hub is positioned on a first one of the two axle parts and the transmission is positioned on a second one of the two axle parts, and
where the axle shaft is inserted only through the first axle part and the second axle part is connected to the rear fork.

An advantage of this construction is that when the rear wheel is to be changed, no electrical conductors need be interrupted. Furthermore, with this construction it is no longer necessary to uncouple the chain from the the rear wheel when the rear wheel is taken out.

Again a further advantageous embodiment of the bicycle according to the invention is characterized in that the bicycle comprises only a single front sprocket. Electrical actuation of the adjusting mechanism for changing the transmission ratio between the front sprockets usually requires relatively much energy which in turn requires a relatively large battery. More particularly shifting the chain from one to the next sprocket present on the crank axle costs relatively much energy since there is a large difference in diameter between the front sprockets and since the chain is under stress in the place of the shifting mechanism. By inserting a transmission between the rear sprocket and the wheel hub, a front derailleur may be dispensed with. The transmission allows of being operated with relatively little energy since for this operation no chain needs to be shifted. As a result, the actuation means for changing the transmission between the crank axle and the wheel hub of the bicycle according to the invention require little energy, so that it is pre-eminently suitable for these actuation means and the operation of them to be executed electrically and to retain a small required battery.

A further advantageous embodiment of the bicycle according to the invention is characterized in that:

the axle shaft is releasably connected to the wheel axle and in tangential direction is fixed relative to the wheel hub by means of a releasable form locked connection;

the axle shaft is furthermore releasably connected to a drop out of the rear fork and in tangential direction is fixed relative to the drop out by means of a releasable form locked connection, and the axle shaft is provided with electrical conductors having contact points at their ends, of which the contact points at an end seen in axial direction of the wheel axle are present between the drop outs of the rear fork and make contact with contact points of further conductors connected to the actuation means and the contact points at the other end of the electrical conductors of the axle shaft seen in axial direction of the wheel axle are present outside the drop outs and make contact with further contact points of further electrical conductors connected to the bicycle frame which are coupled to the operating means.

An advantage of this construction is that via the axle shaft both the torque support and the electrical connection is realised, as a result of which only the axle shaft needs to be removed when the rear wheel is changed and no separate action need be taken for mechanically and electrically decoupling the parts.

The bicycle preferably comprises an electrically actuated rear derailleur and the operating means are further electrically coupled to further actuation means of the rear derailleur. As a result of this, the complete gear mechanism of the bicycle is arranged electrically and the electrical wiring can be installed on one side of the frame, so that little electrical wiring will suffice.

The operating means are coupled preferably in a wireless manner to the actuation means of the transmission and/or the rear derailleur. In consequence, there is no need for electrical conductors to be fitted between the operating means and the actuation means on or in the frame of the bicycle.

A still further advantageous embodiment of the bicycle according to the invention is characterized in that the bicycle comprises a control unit which controls the derailleur and/or the transmission based on an entered desired drive between crank axle and wheel hub. As a result, the user need not separately select the drive and the shifting of the chain to another rear sprocket, but this can be executed automatically by the control unit.

A further advantageous embodiment of the bicycle according to the invention is characterized in that the operating means comprise an operating button which is fitted to the handlebars of the bicycle, as well as a display or indicator that shows the gear selected by the transmission. The user himself, it is true, is to select the drive of the transmission and the shifting of the chain on the rear sprockets, but he is assisted for this action by the indication of the drive that has been selected.

BRIEF DESCRIPTION OF THE DRAWING FIGURE

The invention will be further described hereinbelow in more detail with reference to an example of embodiment represented in the drawings of a rear wheel axle of a bicycle comprising a wheel hub and a driver according to the invention, in which drawings:

FIG. 3 and FIG. 4 show different preferred positions of the operable pawls in the couplings connected to the planetary gear set;

FIG. 5 shows a sectional view of the rear wheel axle where the wheel axle and axle shaft are locked in drop outs;

FIG. 6 shows a sectional view of the separate wheel axle of the rear wheel axle locked in the drop out;

DETAILED DESCRIPTION OF THE DRAWING FIGURES

Figure 1:
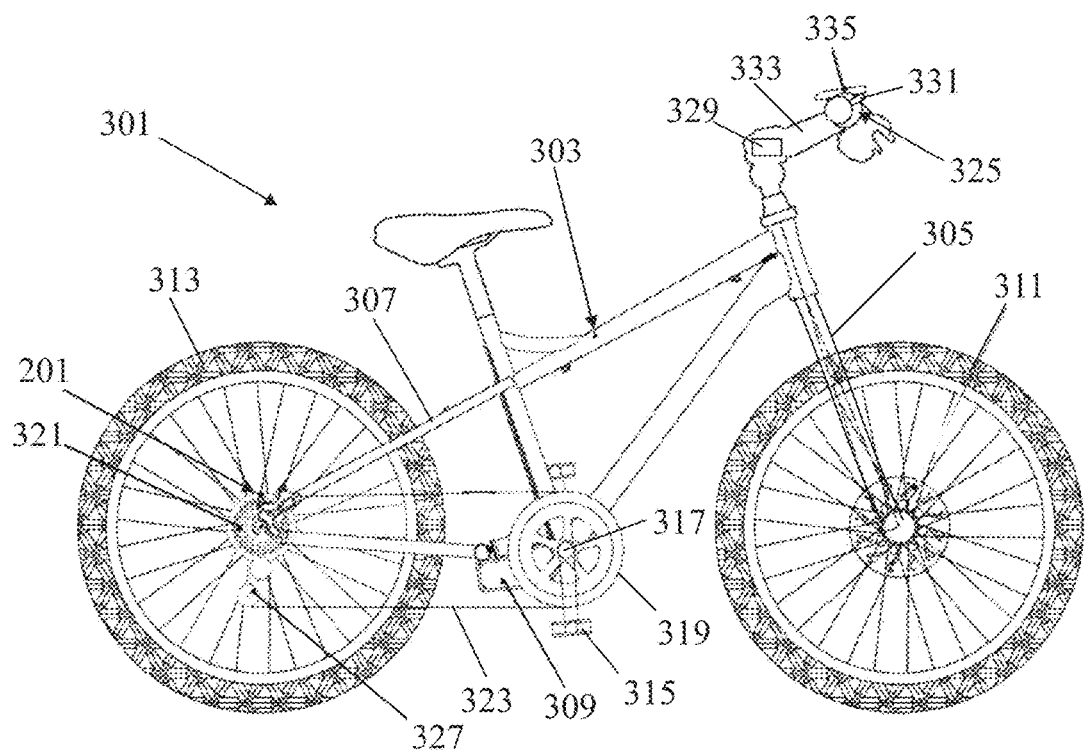
FIG. 1 shows an embodiment of the bicycle according to the invention.

FIG. 1 shows an embodiment of the bicycle according to the invention. The bicycle 301 comprises a frame 303 equipped with a front fork 305 and a rear fork 307, as well as a crank axle housing 309, a front wheel and a rear wheel 311, 313 located in the front and rear fork respectively, pedals 315 which are connected to a crank axle 317 which is bearing-mounted in the crank axle housing 309, a front sprocket 319 which is connected to the crank axle 317, a plurality of rear sprockets 321 which are connected to a driver body 33 which is connected to a wheel hub 201 of the rear wheel 313, a chain 323 threaded over the front sprocket and one of the rear sprockets, a driver 31 including at least two switchable drives between the driver body 33 and the wheel hub 201 of the rear wheel 313 and which driver is provided with actuation means 81 (see FIG. 2) for switching between the drives, and operating means 325 for operating the actuation means.

The bicycle 301 comprises no more than a single front sprocket 319 and the actuation means 81 of the driver 31 are arranged in an electrical version and the operating means 325 are electrically coupled to the actuation means. The bicycle 301 comprises an electrically actuated rear derailleur 327 and the operating means 325 are furthermore electrically coupled to the actuation means 81 of the rear derailleur.

The operating means 325 are coupled in a wireless manner to the actuation means 81 of the driver 31 and/or the rear derailleur 327. The bicycle further includes a control unit 329 for controlling the rear derailleur 327 and/or the driver 31 based on an entered desired drive between crank axle 317 and wheel hub 201. The operating means 325 comprise an operating button 331 which is fitted to the handlebars 333 of the bicycle, as well as a display 335 or indicator indicating the gear the driver is in.

Figure 2:
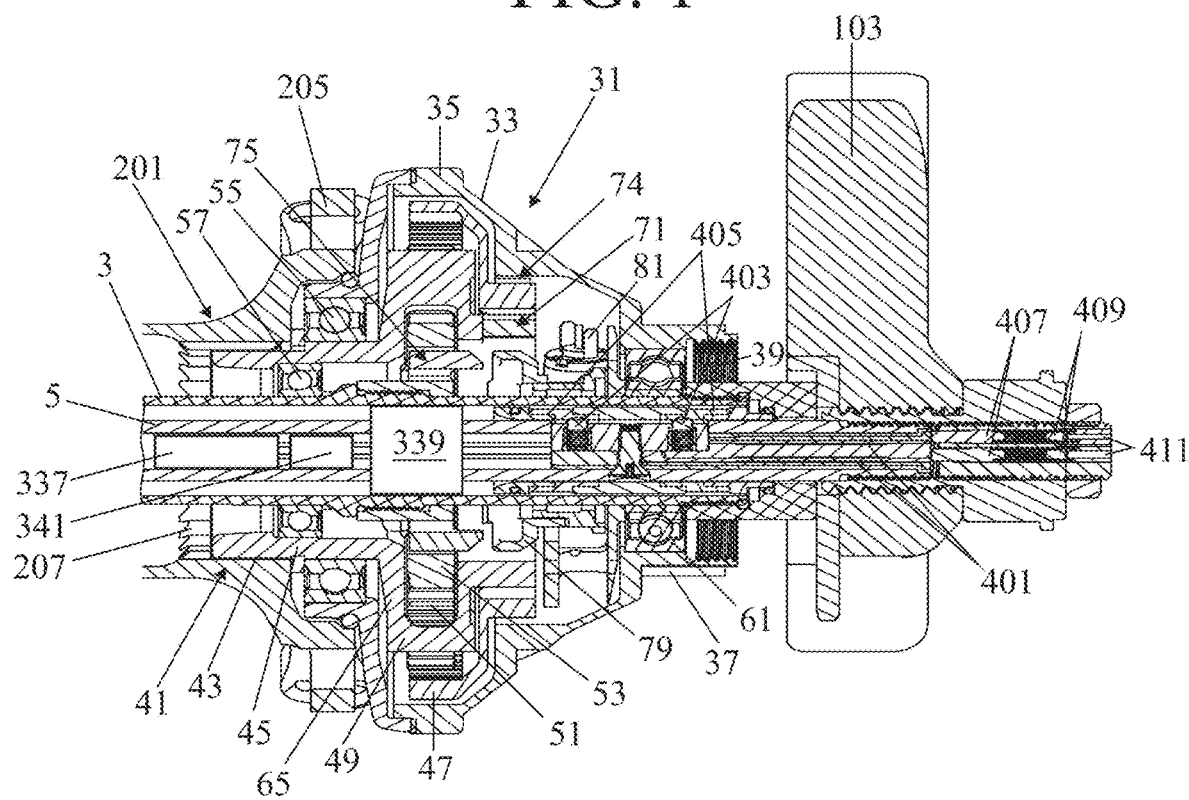
FIG. 2 shows a sectional view of a wheel axle of a rear wheel axle with mounted to it a wheel hub and a driver.

FIG. 2 shows a sectional view of a wheel axle 3 of a rear wheel axle with bearing-mounted on it a wheel hub 201 and a driver 31 according to the invention connected to the wheel axle and the wheel hub. The wheel axle 3 is hollow and at one end (the end not represented in FIG. 2) is provided with internal splines for a form locked connection to one of the drop outs of a rear fork of a bicycle frame (see FIG. 3). Via this form locked connection the wheel axle can support torque, which torque is a reaction torque of the drives between a driver body 33 of the driver and the wheel hub 201. The wheel hub 201 and the driver 31 connected to it are bearing-mounted on the wheel axle 3. The wheel hub has two spoke flanges 205 to which spokes (not shown) of a wheel are fitted. A sprocket carrier (not shown) with sprockets fitted to it can be installed on the driver body 33 of the driver 31. To this end the driver body 33 is provided with connecting means (splines 35, 37 and internal thread 39) via which the sprocket carrier provided with further connecting means can be connected to the driver body.

The driver 31 comprises two switchable drives between the driver body 33 and the wheel hub 201, as a result of which only a single sprocket on the crank axle will suffice, and a front derailleur of a bicycle may thus be omitted. The driver 31 is coupled via splines 41 to the wheel hub 201. These splines comprise internal splines 207 present in the wheel hub and external splines 43 on an output coupling bush 45 of the driver. The driver 31 together with the hollow wheel axle 3 to which it is attached forms a unit which can be inserted as a whole into the wheel hub 201 and together with the wheel hub (and the rest of the rear wheel the wheel hub forms part of) can be pushed in between drop outs 101 and 103 of a rear fork of a bicycle frame and also taken out.

The driver 31 comprises a planetary gear set having three rotational members, of which a first rotational member is formed by an annulus gear 47, a second rotational member is formed by a planet gear support 49 to which a plurality of planet gears 51 are bearing-mounted and which is connected to coupling means formed by the coupling bush 45 that has external splines 43, and a third rotational member is formed by a sun gear 53 which is connected to the wheel axle 3.

The first rotational member 47 is connected to the second rotational member 51 via a first switchable coupling 71 and the third rotational member 53 is connected to a second switchable coupling 75 via which the third rotational member can be connected to the wheel axle 3. The driver 31 further includes a switching mechanism for switching the switchable couplings 71 and 75. The switching mechanism is located in the space 81 within the driver body 33 and has a sliding ring 79 which by axial displacement can operate the two couplings. The switching mechanism further includes an electrical actuator for displacing the sliding ring 79. This actuator has a stator which is mounted to the wheel axle 3.

The sliding ring 79 and the actuator are present in the driver body 33 on the planetary gear set side turned away from the coupling means 41. The actuator is provided with connecting pins which protrude into the wheel axle 3 through one or more openings and are isolated from the wheel axle.

The axle shaft is provided with electrical conductors 401 which have contact points at their ends, of which the contact points 403 at an end seen in axial direction of the wheel axle are present between the drop outs 101 and 103 of the rear fork 307 and make contact with contact points of further conductors 405 connected to the actuation means and the contact points 407 are present at the other end of the electrical conductors of the axle shaft seen in axial direction of the wheel axle outside the drop outs 101 and 103 and make contact with further contact points 409 of further electrical conductors 411 connected to the bicycle frame and which are coupled to the operating means.

FIGS. 3 and 4 show two variants of operable pawls 73 and 77 of the couplings 71 and 75 in the planetary gear set. In this gear set the annulus gear is driven and planet gear support c forms the output. The sun gear s can be coupled to the wheel axle 3. FIG. 3 shows a first embodiment of the planetary gear set provided with operable pawls 73 and 77. The wheel axle 3 is in this case fixed to the frame of the bicycle. Pawl 77 is rotatably connected to the wheel axle 3 and is in engagement with the sun gear s. Pawl 73 is rotatably connected to the planet gear support c and is in engagement with annulus gear a.

FIG. 4 shows a second embodiment of the planetary gear set provided with operable pawls 73 and 77. Here the wheel axle 3 is fixed to the frame of the bicycle. Pawl 77 is rotatably connected to the wheel axle and is in engagement with the sun gear s. Pawl 73 is rotatably connected to the annulus gear a and is in engagement with the planet gear support c.

Between the coupling means (coupling bush 45) and the driver body 33 is located a first sealing which is formed by a left hand sealed driver body bearing 55 (first sealed ball bearing) whose outer peripheral side is connected to the driver body and whose inner peripheral side is connected to the coupling means (coupling bush 45). Between the coupling means (coupling bush 45) and the wheel axle 3 is located a second sealing which is formed by a support bearing 57 (sealed needle bearing). The sealing ring 59 of the support bearing is connected with its outer peripheral side to the coupling means (coupling bush 45). Between the driver body 33 and the wheel axle 3 is located a third sealing which is formed by a right-hand sealed driver body 61 (second sealed ball bearing) whose outer peripheral side is connected to the driver body. The outer peripheral side of the support bearing 57 is connected to the coupling means (coupling bush 45) and is present between the second and third sealing. The rollers 61 of the support bearing run over a roller face 63 present on the wheel axle 3.

The coupling means which are formed by the coupling bush 45 provided with external splines cooperate with further coupling means which are formed by the internal splines 207 present in the wheel hub 201. At the other end the coupling bush 45 is provided with a flange 65 which forms part of or is connected to the second rotational member. The left-hand driver body 55 is present here between the external splines 43 and the flange 65 on the coupling bush 45. The wheel hub 201 is bearing-mounted on the wheel axle 3 near a first end through a wheel hub bearing (not shown in the Figures) and at a second end is provided with the further coupling means which are formed by the internal splines 207.

Figure 7:
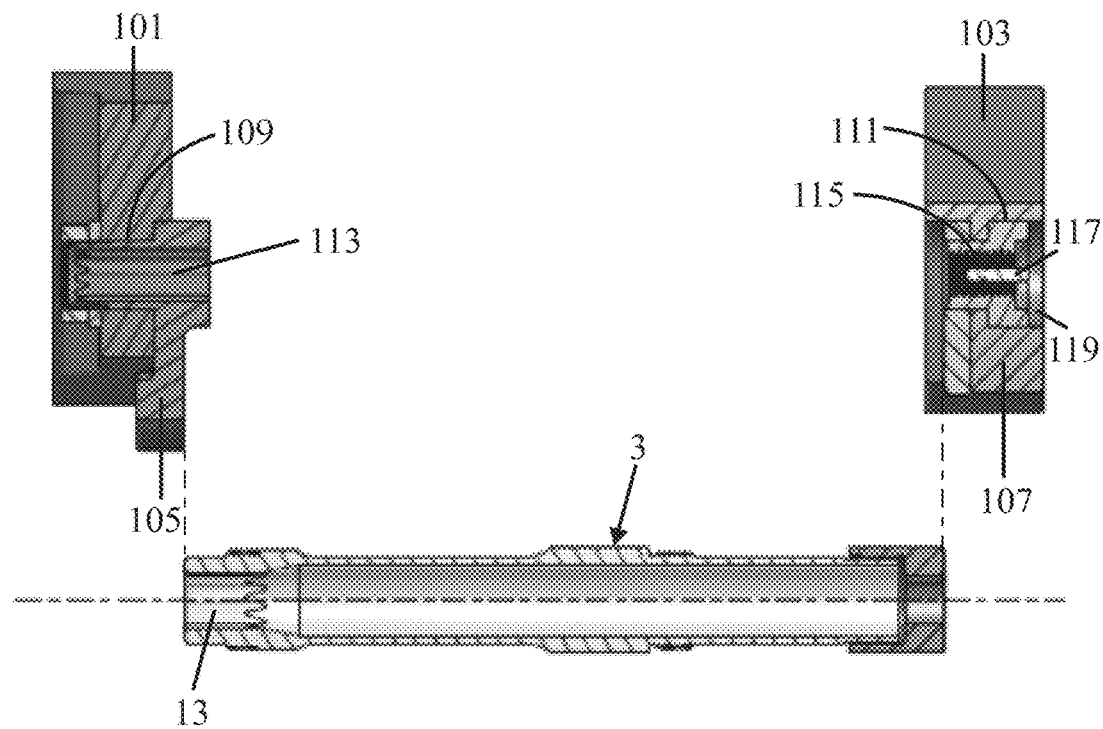
FIG. 7 shows a sectional view of the drop outs of a rear fork of a wheel axle of another rear wheel axle taken out of a bicycle frame.

FIG. 5 shows a sectional view of the rear wheel axle 1 fixed to the drop outs 101 and 103 of the rear fork of a bicycle. The rear wheel axle 1 comprises the hollow wheel axle 3 accommodating an axle shaft 5 inserted through it. The rear wheel axle comprises torque support means for supporting on a bicycle frame the torque exerted on the wheel axle. These torque support means are formed by internal splines 13 in the left-hand end of the hollow wheel axle (see FIGS. 4 and 5), internal splines 113 in a torque support arm 105 which is present in an opening 109 in the left-hand drop out 101 and which rests against the drop out (see FIG. 9), and external splines 12 (see FIGS. 5 and 8) on a bush 11 freely rotatable around a pin 7. The internal splines 13 in the wheel axle 3 and the right-hand part of the bush 11 here form a first form locked connection and the internal splines 113 in the torque support arm 105 and the left-hand part of the bush 11 form a second form locked connection. After removing the axle shaft 5 by removing same in axial direction from the wheel axle, the wheel axle 3 can be removed in radial direction from between the drop outs 101 and 103 of the rear fork (see FIG. 7).

Figure 8:
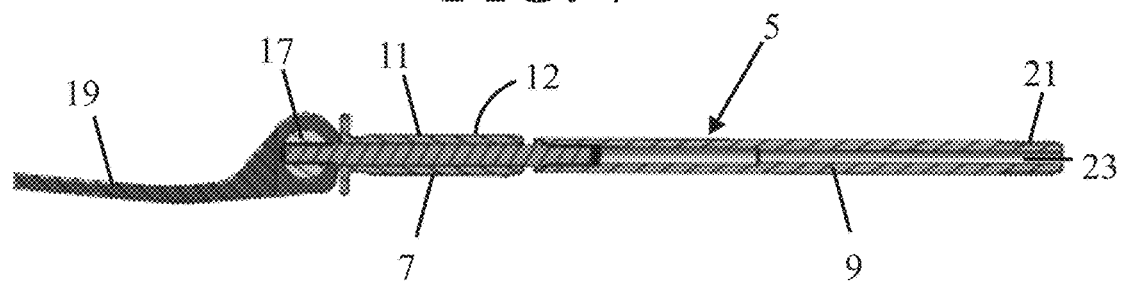
FIG. 8 shows a sectional view of the separate axle shaft of the rear wheel axle.

The pin 7 with the bush 11 freely rotating around it and with a further pin 9 connected to the pin 7 via a threaded connection jointly form the axle shaft 5 (see FIG. 8). The axle shaft has at its left end a lever 19 which is eccentrically connected to an axle 17 mounted to the end of the pin 7 and forms a quick release mechanism (see FIG. 9) for clamping the wheel axle 3 between the drop outs 101 and 103 of a bicycle frame. The free end of the further pin 9 is provided with external thread 21 which is turned into a cap 107 present in an opening 111 in the right-hand drop out 103, which cap has internal thread.

The further pin 9 has at its threaded end 21 a central recess 23 whose inside wall is provided with two electrical contacts which are present side by side in axial direction. The right-hand drop out 103 is provided with a cap 117 (see FIG. 7) which through a bridge plate 119 is connected to the cap 107 and extends in the middle of the opening 111 and forms an extender provided with two further electrical contacts which are present side by side in axial direction and are in contact with the contacts in the right-hand end of the further pin 9 of the axle shaft 5.

Figure 9:
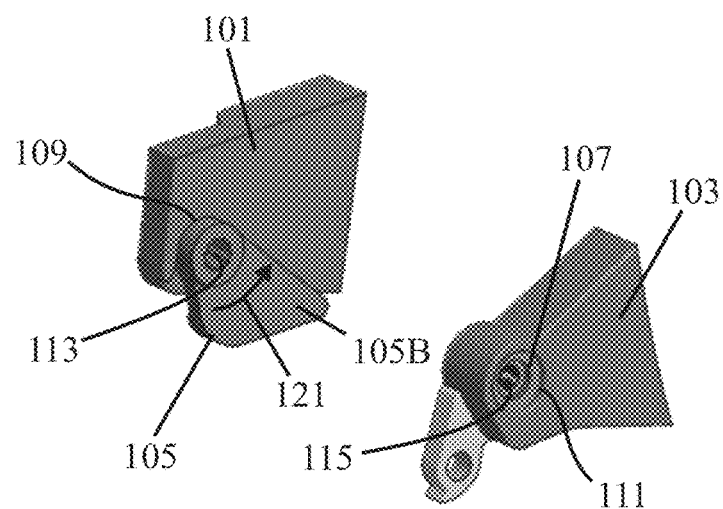
FIG. 9 shows a perspective view of the drop outs shown in FIG. 7.

FIG. 9 shows by way of illustration the drop outs 101 and 103 in a perspective view. The openings 109 and 111 in the drop outs accommodate inserts in the form of a torque support arm 105 that is provided with internal splines 113 and a hollow cap 107 that is provided with internal thread 115. An end 105B of the torque support arm 105 rests against the drop out 101 in the direction of rotation 121 so that this drop out 101 is locked against rotation and can thus support torque.

Figure 10:
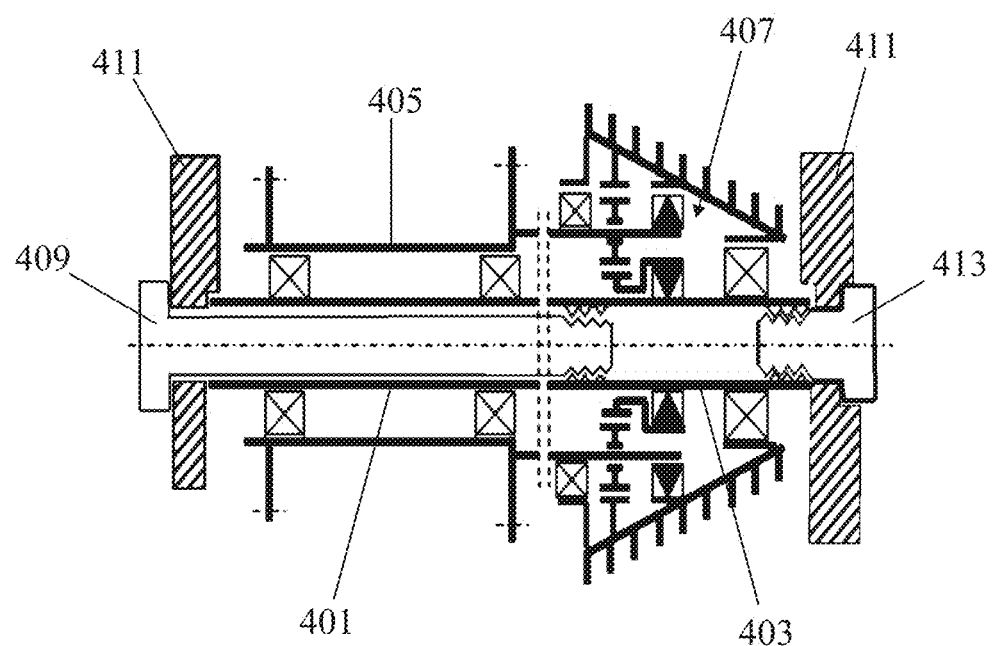
FIG. 10 shows a sectional view of a wheel axle of another rear wheel axle of the bicycle according to the invention.
Figure 11:
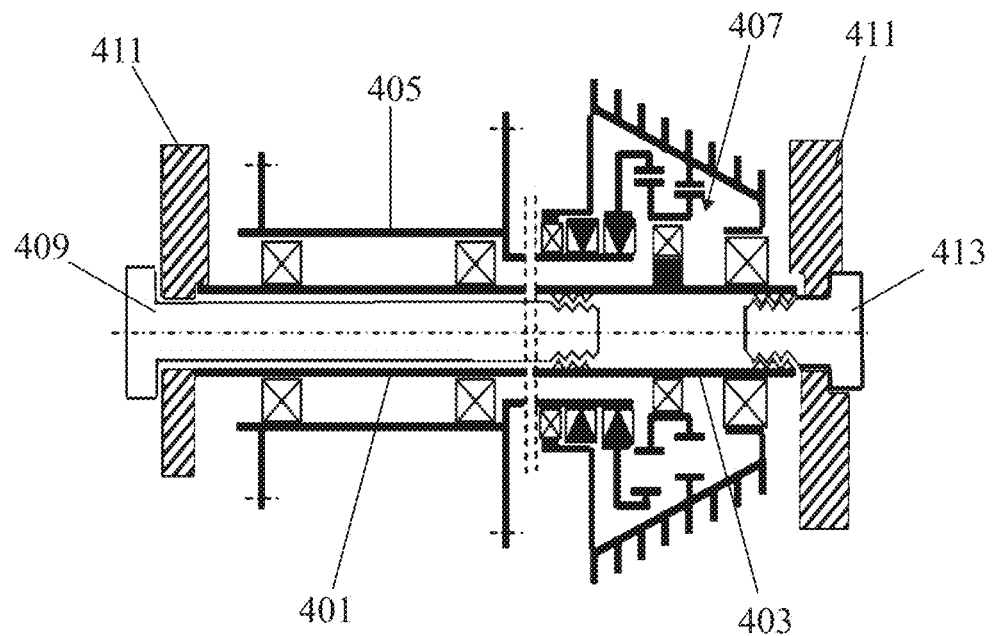
FIG. 11 shows a sectional view of a wheel axle of yet another rear wheel axle of the bicycle according to the invention.

FIGS. 10 and 11 show sectional views of rear wheels of two further embodiments of the bicycle according to the invention. The hollow wheel axle here comprises a first axle part 401 where the wheel hub is located, as well as a second axle part 403 where the driver 407 is located. The axle shaft 409 is inserted only through the first axle part 401 and the second axle part 403 is connected to the rear fork 411 by means of a bolt 413. The rear wheel can be removed from the rear fork by releasing the axle shaft and removing it from the first axle part, while the second axle part with the driver present on it continues to be connected to the rear fork. In FIG. 11 the drive is arranged as a planetary gear set having only a single planet gear 407 which is bearing-mounted eccentrically relative to the stationary wheel axle. The planetary gear set has a stepped design (consists of two different diameters of gears that are coupled to each other). A first one of the two planet gear diameters is in engagement with an annulus gear which is connected to the driver body. A second one of the two planet gear diameters is in engagement with an annulus gear which can be connected to the wheel hub. This embodiment of the planetary gear set enables the realisation of a very small step in transmission ratio, which may be advantageous for certain applications.

Albeit the invention has been elucidated in the foregoing with reference to the drawings, it should be set out that the invention is not by any manner or means restricted to the embodiments shown in the drawing figures. The invention also extends to any embodiments deviating from the embodiments shown in the drawing figures within the scope defined by the claims.

The invention claimed is:
1. A bicycle, comprising:
 a frame with each of a front fork, a rear fork, and an axle housing;
 a front wheel and a rear wheel, fitted respectively to the front and rear forks;
 a drive axle bearing-mounted in the axle housing;
 a front sprocket;
 a rear axle assembly, including:
  a plurality of rear sprockets connected to a driver body for driving the driver body in rotation, and
  an electrically actuated rear derailleur,
  the driver body being connected to a wheel hub of the rear wheel via a transmission, for driving the wheel hub in rotation,
  the transmission including at least two drives between the driver body and the wheel hub,
  said transmission provided with an electric actuator of the transmission for switching between the at least two drives, and
  the wheel hub and the transmission being positioned on a wheel axle of the rear wheel;
 a chain threaded around the front and rear sprockets; and
 operating means for operating the electric actuator of the transmission,
 wherein the operating means are electrically coupled to the electric actuator of the transmission and to an electric actuator of the rear derailleur, and
 wherein a storage element for storing electrical energy is coupled to at least one of the electric actuator of the transmission and the operating means.
2. The bicycle as claimed in claim 1, wherein a generator is connected to at least one of the wheel hub and the wheel axle.
3. The bicycle as claimed in claim 1, wherein the storage element for storing electrical energy is connected to the wheel axle.
4. The bicycle as claimed in claim 1, wherein:
 seen in an axial direction of the wheel axle, the transmission is positioned outside spoke flanges of the rear wheel, and
 the wheel axle has two separate axle parts,
  where the wheel hub is positioned on a first one of the two axle parts and the transmission is positioned on a second one of the two axle parts, and
  where an axle shaft is inserted through the first one of the two axle parts, and the second one of the two axle parts is connected to the rear fork.
5. The bicycle as claimed in claim 1, wherein:
 the axle shaft is releasably connected to the wheel axle and in tangential direction is fixed relative to the wheel axle by means of a releasable locking connection,
 the axle shaft is furthermore releasably connected to drop outs of the rear fork and in tangential direction is fixed relative to the drop outs by means of a releasable locking connection, and
 the axle shaft is provided with electrical conductors having contact points at their ends, of which the contact points at a first end seen in axial direction of the wheel axle are present between the drop outs of the rear fork and make contact with contact points of further conductors connected to the electric actuator of the transmission and the contact points at a second end of the electrical conductors of the axle shaft seen in axial direction of the wheel axle are present outside the drop outs and make contact with further contact points of further electrical conductors connected to the bicycle frame which are coupled to the operating means.
6. The bicycle as claimed in claim 1, wherein the operating means are coupled in a wireless manner to at least one of the electric actuator of transmission and the electric actuator of the rear derailleur.

7. The bicycle as claimed in claim 1, further comprising:
a control unit which controls at least one of the rear derailleur and the transmission, based on an entered desired drive between crank axle and wheel hub.

8. The bicycle as claimed in claim 1, wherein the operating means comprise an operating button which is fitted to the handlebars of the bicycle.

9. The bicycle as claimed in claim 8, further comprising:
a display or indicator, that indicates the gear selected by the transmission.

10. The bicycle as claimed in claim 1, further comprising:
a generator that converts motion energy of the bicycle into current; and
a charger connected to the generator and to the electrical energy storage element for charging the storage element.

\* \* \* \* \*